United States Patent
Fan

(10) Patent No.: US 12,224,855 B2
(45) Date of Patent: Feb. 11, 2025

(54) RECEIVER FILTERING

(71) Applicant: MAXLINEAR, INC., Carlsbad, CA (US)

(72) Inventor: Youzhe Fan, Carlsbad, CA (US)

(73) Assignee: MAXLINEAR, INC., Carlsbad, CA (US)

( * ) Notice: Subject to any disclaimer, the term of this patent is extended or adjusted under 35 U.S.C. 154(b) by 0 days.

(21) Appl. No.: 18/354,580

(22) Filed: Jul. 18, 2023

(65) Prior Publication Data

US 2023/0370192 A1 Nov. 16, 2023

Related U.S. Application Data

(63) Continuation of application No. 17/644,338, filed on Dec. 14, 2021, now Pat. No. 11,705,988, which is a continuation of application No. 16/860,587, filed on Apr. 28, 2020, now Pat. No. 11,201,693.

(51) Int. Cl.
| | |
|---|---|
| *H04L 27/06* | (2006.01) |
| *H04L 1/00* | (2006.01) |
| *H04L 25/02* | (2006.01) |
| *H04L 25/03* | (2006.01) |
| *H04L 25/06* | (2006.01) |

(52) U.S. Cl.
CPC ............ *H04L 1/0054* (2013.01); *H04L 1/005* (2013.01); *H04L 25/0204* (2013.01); *H04L 25/03006* (2013.01); *H04L 25/067* (2013.01)

(58) Field of Classification Search
CPC ... H04L 1/0054; H04L 1/005; H04L 25/0204; H04L 25/03006; H04L 25/067; H04L 2025/03585; H04L 25/03038

USPC .......................................................... 375/341
See application file for complete search history.

(56) References Cited

U.S. PATENT DOCUMENTS

| | | | |
|---|---|---|---|
| 5,282,225 A | 1/1994 | Nikias et al. | |
| 5,648,991 A | 7/1997 | Namekata et al. | |
| 5,742,642 A | 4/1998 | Fertner | |
| 5,835,541 A | 11/1998 | Namekata et al. | |
| 6,067,319 A * | 5/2000 | Copeland | H04L 25/03057 375/348 |
| 6,134,280 A | 10/2000 | Matui | |
| 6,366,605 B1 | 4/2002 | Schilling | |
| 8,401,120 B1 | 3/2013 | Ozgur | |
| 8,520,782 B2 | 8/2013 | Jonsson et al. | |
| 8,553,822 B2 | 10/2013 | Gore et al. | |
| 9,559,809 B2 | 1/2017 | Visoz et al. | |
| 11,201,693 B2 | 12/2021 | Fan | |
| 11,705,988 B2 | 7/2023 | Fan | |
| 2007/0201545 A1* | 8/2007 | Zamir | H04L 25/06 375/229 |

(Continued)

*Primary Examiner* — Helene E Tayong
(74) *Attorney, Agent, or Firm* — Buchalter; Jason W. Croft

(57) ABSTRACT

A receiver may include a first filter configured to generate a first estimation of a symbol of a received signal and a second filter configured to generate a second estimation of the symbol of the received signal. The receiver may also include a decoder configured to decode the symbol using one of the first estimation and the second estimation and a decision circuit configured to select one of the first estimation and the second estimation to provide to the decoder for decoding of the symbol based on a comparison of the first estimation to an estimation threshold.

20 Claims, 6 Drawing Sheets

(56) References Cited

U.S. PATENT DOCUMENTS

2014/0192854 A1     7/2014   Umeda
2021/0336718 A1   10/2021   Fan

\* cited by examiner

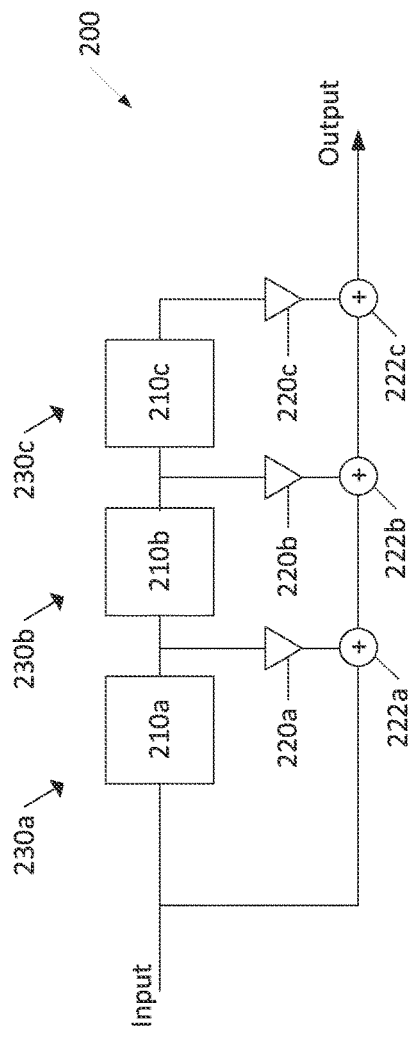
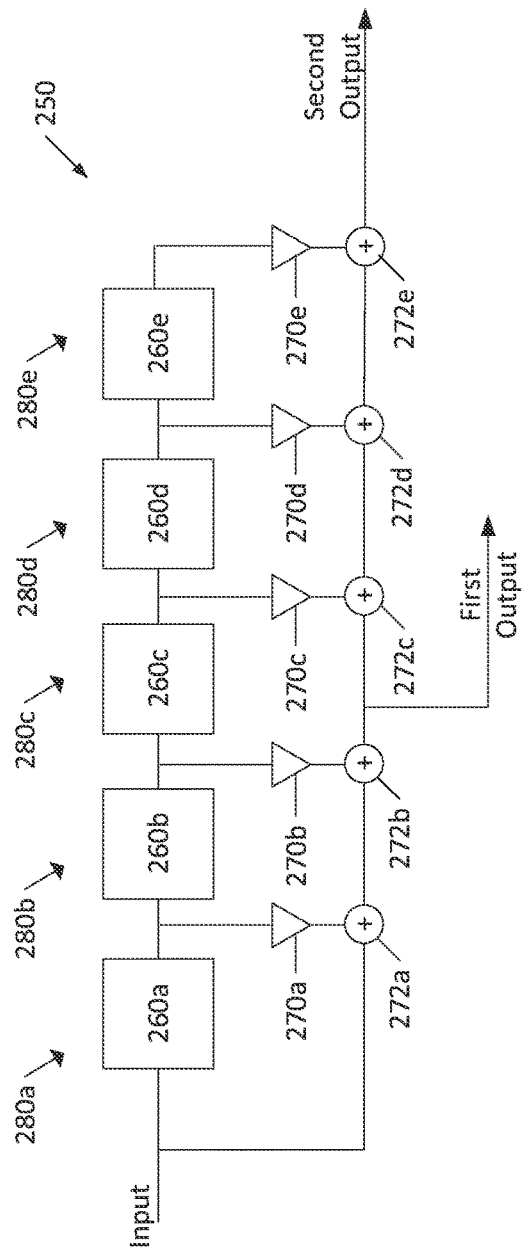
Fig. 2a
Fig. 2b

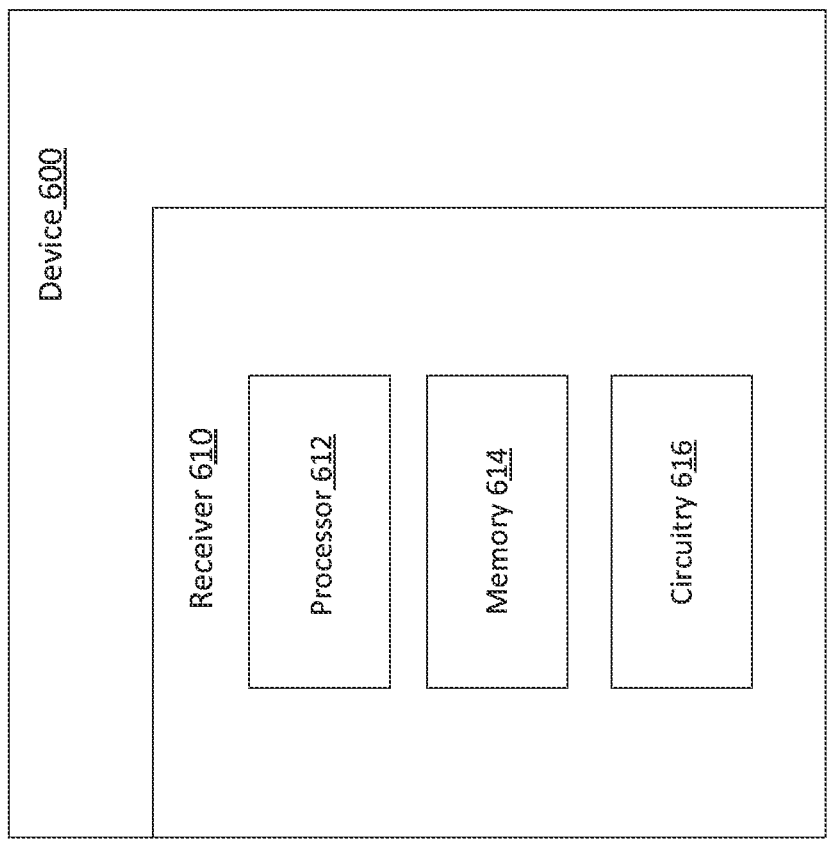

RECEIVER FILTERING

CROSS-REFERENCE TO RELATED APPLICATIONS

This application is a continuation of U.S. patent application Ser. No. 17/644,338, filed Dec. 14, 2021, titled RECEIVER FILTERING, which claims priority to U.S. patent application Ser. No. 16/860,587, filed Apr. 28, 2020, titled RECEIVER FILTERING, each of which are incorporated herein by reference in their entireties.

FIELD

The embodiments discussed herein are related to receiver filtering.

BACKGROUND

An amount of digital data storage and transmission is continually increasing. Among undesired phenomena of digital data transmission is intersymbol interference. Intersymbol interference is a common practical impairment found in many transmission and storage systems. Intersymbol interference is a form of distortion of a signal in which one symbol interferes with subsequent and/or former symbols having similar effect as noise, thus making the transmission less reliable. To reduce the effects of intersymbol interference, receivers may include a filter that assists in compensating for the intersymbol interference among other types of noise or signal distortion.

The subject matter claimed herein is not limited to embodiments that solve any disadvantages or that operate only in environments such as those described above. Rather, this background is only provided to illustrate one example technology area where some embodiments described herein may be practiced.

SUMMARY receiver may include a first filter configured to generate a first estimation of a symbol of a received signal and a second filter configured to generate a second estimation of the symbol of the received signal. The receiver may also include a decoder configured to decode the symbol using one of the first estimation and the second estimation and a decision circuit configured to select one of the first estimation and the second estimation to provide to the decoder for decoding of the symbol based on a comparison of the first estimation to an threshold.

BRIEF DESCRIPTION OF THE DRAWINGS

Example embodiments will be described and explained with additional specificity and detail through the use of the accompanying drawings in which:

FIG. 2a illustrates an example filter;
FIG. 2b illustrates another example filter;
FIG. 6 illustrates an example device that includes a receiver.

DESCRIPTION OF EMBODIMENTS

Figure 1:
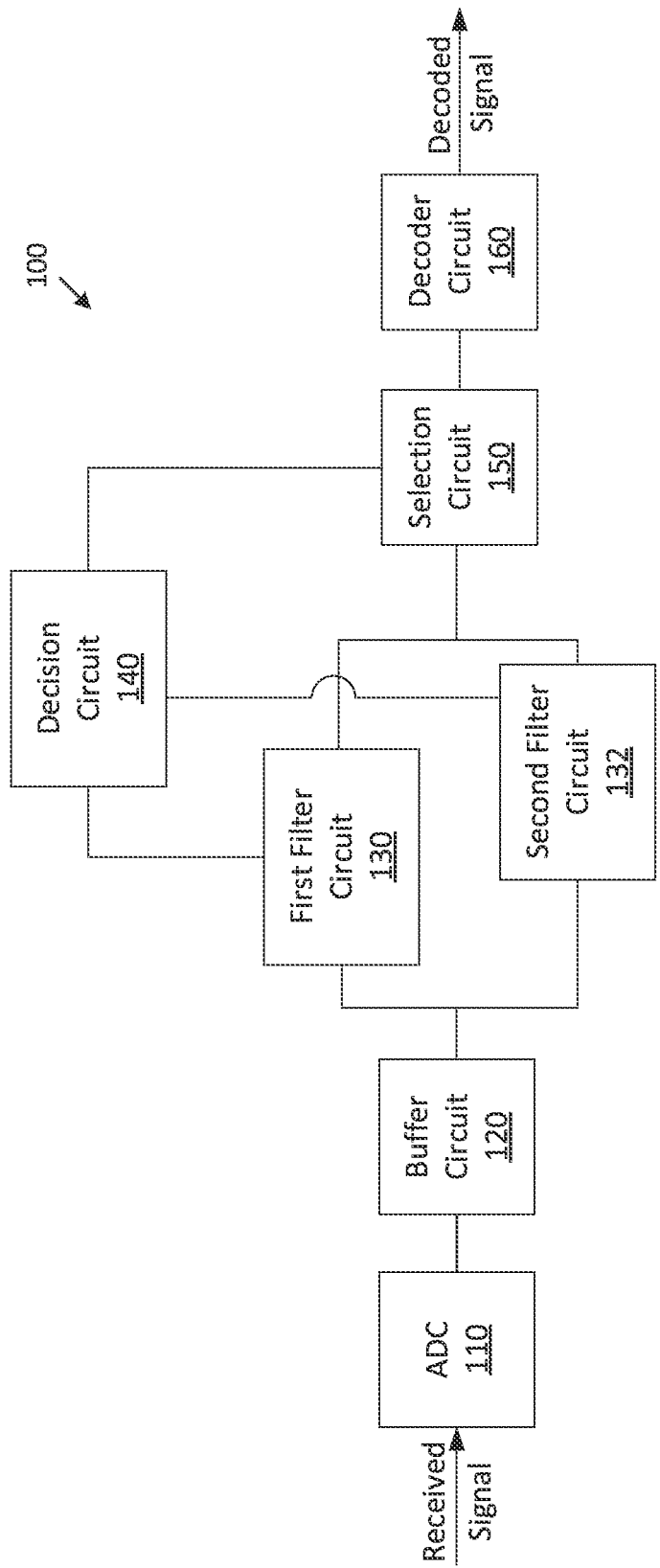
FIG. 1 illustrates an example receiver.

Receivers, such as receivers in optical, wireless, and electrical signaling systems, may include equalizers in the discrete domain. The equalizers may assist in compensating for intersymbol interference, which is practical impairment found in many transmission and storage systems. Intersymbol interference is a form of distortion of a signal in which one symbol interferes with former and/or subsequent symbols having similar effect as noise, thus making the transmission less reliable. Equalizers may also assist in compensating for channel distortion and noise, among other types of signal distortion that may occur as a signal transverses a channel. Compensating for intersymbol interference, noise, and other channel distortion may increase signal to noise ratio of a signal thereby decreasing packet loss during transmission. An example equalizer may include a feed forward equalizer (FFE) and a decision feedback equalizer (DFE), among other types of equalizers.

In some circumstances, an output of an equalizer may be provided to a decoder, such as a slicer, that is configured to decode symbols of a received signal. In some circumstances, a decoder may decode symbols based on a magnitude and/or phase of an input to the decode. For example, the decoder may compare the magnitude and/or phase of the input to one or more decode thresholds to decode the symbols.

In some circumstances, first symbols of a signal may be distorted during transmission such that a probability that the first symbols may be properly decoded by the decoder using an equalizer with N number of taps is large. Likewise, second symbols of the signal may be distorted during transmission such that a probability that the second symbols may be properly decoded by the decoder using the equalizer with the N number of taps is low. To increase the probability to properly decode the second symbols, an equalizer with M number of taps, where M is larger than N, may be used. Because it is difficult to accurately predict the signal distortion symbol by symbol, some known equalizers may use M number of taps to assist in proper decoding of all of the symbols of a signal. Increasing a number of taps used for all symbols may increase a power consumption of the equalizer.

Some embodiments of this disclosure describe systems, methods, and/or circuits that may use a first equalizer to equalize all symbols of a signal. In response to an estimation of a first symbol after equalization being within a region centered around a decode magnitude of a decoder, the first symbol may be equalized using a second equalizer. In these and other embodiments, the second equalizer may include a number of taps that is larger than a number of taps of the first equalizer or may have a power consumption or circuits complexity higher than those of the first equalizer.

In some embodiments, the estimation of the first symbol after equalization being within the region centered around the decode magnitude may indicate a decrease in the probability of the decoder properly decoding the symbol without additional equalization. For example, the estimation of the first symbol after equalization being within the region centered around the decode magnitude may indicate that the first equalizer may have an impulse response that does not accurately compensate for the signal distortion such that the estimation of the first symbol provided to the decoder may result in the decoder decoding the first symbol incorrectly.

In these and other embodiments, additional equalization may be applied to the first symbol by the second equalizer before decoding of the first symbol by the decoder to increase the probability of the decoder properly decoding the symbol. For example, the second equalizer may have an impulse response that more accurately compensates for the signal distortion such that the estimation of the first symbol provided to the decoder may result in the decoder correctly decoding the first symbol. As a result, in some embodiments, power consumption of the systems, methods, and/or circuits described in this disclosure may be reduced as compared to other systems that always run more complex equalizers because the second equalizer may be used for some but not all symbols.

Turning to the figures, FIG. 1 illustrates an example receiver 100. The receiver 100 may be arranged in accordance with at least one embodiment described in the present disclosure. In some embodiments, the receiver 100 may be configured to filter and decode a signal. An amount of filtering applied to the signal may vary based on an initial filtered value of the signal. For example, the receiver 100 may initially filter the signal and compare a value of the filtered signal to a threshold. In response to the filtered value satisfying the threshold, the filtered signal may be decoded. In response to the filtered value not satisfying the threshold, the signal may be re-filtered or additionally filtered and decoded. By only applying the additional filter or re-filter to some portions of the signal, power consumption of the receiver 100 may be reduced.

The receiver 100 may include an analog to digital converter (ADC) 110, a buffer 120, a first filter 130, a second filter 132, a decision circuit 140, a selection circuit 150, and a decoder 160.

In some embodiments, the ADC 110 may be configured to receive a signal. The signal may be a serial signal. Alternately or additionally, the signal may be one channel in a parallel signal.

In some embodiments, the signal may be formed of multiple symbols that are each modulated with data. The modulation scheme may be a non-return-to-zero modulation (NRZ), a pulse amplitude modulation (PAM), a return-to-zero modulation (RZ), a Manchester modulation, a binary phase shift keying modulation (BPSK), a serial minimum frequency-shift keying modulation (SMSK), a duobinary modulation, a differential phase-shift keying modulation (DPSK), a quaternary phase-shift keying modulation (QPSK), a quadrature amplitude modulation (QAM), an amplitude and phase-shift keying modulation (APSK) or an orthogonal frequency-division multiplexing modulation (OFDM), among other multi-carrier modulations schemes or other types of modulation schemes.

In some embodiments, the signal may be an analog signal that may be converted to a discrete signal by the ADC 110. In some embodiments, the signal may be processed before being received by the ADC 110. For example, the signal may be amplified and equalized before being provided to the ADC 110. In these and other embodiments, the receiver 100 may include a low noise amplifier and a continuous time linear equalizer. In some embodiments, the signal may be an optical signal, wireless signal, wired signal, or some other type of signal before being received by the receiver 100. The ADC 110 may provide the discrete signal to the buffer 120.

In some embodiments, the buffer 120 may be configured to buffer the signal. The buffer 120 may be configured to buffer the signal for two symbol intervals. A symbol interval may be a number of clock cycles for the receiver 100 to move a symbol of the signal between elements in the receiver 100. The buffer 120 may output the signal for two symbol intervals. As a result, the buffer 120 may output a first symbol of the signal for two symbol intervals. The buffer 120 may provide the signal to the first filter 130 and the second filter 132.

The first filter 130 may be configured to receive the signal from the buffer 120. In some embodiments, the first filter 130 may be configured to filter the signal. In these and other embodiments, the first filter 130 may be configured to filter a single symbol of the signal during a symbol interval. In some embodiments, the first filter 130 may be configured to filter the signal by equalizing the signals. In these and other embodiments, the first filter 130 may be configured as an equalizer. For example, the first filter 130 may be a feed-forward equalizer (FFE) or a decision-feedback equalizer (DFE), among other types of equalizers or filters. The first filter 130 may be configured to equalize the signal to compensate for pre-cursor inter-symbol interference, post-cursor inter-symbol interference, and/or channel distortion, among other types of distortion that may affect the signal as the signal traverses a channel or receiver elements in 100 before reaching the buffer circuit 120.

In some embodiments, the first filter 130 may be configured to generate an estimation of a symbol of the signal. The first filter 130 may provide the estimation of the symbol to the decision circuit 140 and to the selection circuit 150. The estimation of the symbol of the signal may include an estimated magnitude and phase of the symbol.

The second filter 132 may be configured to receive the signal from the buffer 120. In some embodiments, the second filter 132 may be configured to filter the signal. In these and other embodiments, the second filter 132 may be configured to filter a single symbol of the signal during a symbol interval. In some embodiments, the second filter 132 may be configured to filter the signal by equalizing the signal. In these and other embodiments, the second filter 132 may be configured as an equalizer. For example, the second filter 132 may be a feed-forward equalizer (FFE) or a decision-feedback equalizer (DFE), among other types of equalizers or filters. The second filter 132 may be configured to equalize the signal to compensate for pre-cursor inter-symbol interference, post-cursor inter-symbol interference, and/or channel distortion, among other types of distortion that may affect the signal as the signal traverses a channel or receiver elements in 100 before reaching the buffer circuit 120.

In some embodiments, the second filter 132 may be configured to generate an estimation of a symbol. The second filter 132 may provide the estimation of the symbol to the selection circuit 150. The estimation of the symbol of the signal may include an estimated magnitude and phase of the symbol.

In some embodiments, the first filter 130 and the second filter 132 may be the same type of filters. For example, the first filter 130 and the second filter 132 may both be FFEs or DFEs. Alternately or additionally, the first filter 130 may be different type of filter than the second filter 132.

In some embodiments, the first filter 130 may be less complex than the second filter 132. For example, the first filter 130 may include fewer number of taps than the second filter 132. Alternately or additionally, values of taps or arithmetic results of the first filter 130 may include fewer significant digits than values of taps or arithmetic results of the second filter 132. As a result, an estimation generated by the first filter 130 of a first symbol may be different than an estimation generated by the second filter 132 of the first symbol. In some embodiments, an estimation generated by the first filter 130 of a first symbol may be a less accurate representation of an original value of the first symbol than an estimation generated by the second filter 132 of the first symbol. For example, a difference between an estimation generated by the first filter 130 of a first symbol and an original value of the first symbol may be larger than a difference between an estimation generated by the second filter 132 of the first symbol and the original value of the first symbol. In these and other embodiments, an original value of the first symbol may include an original magnitude and an original phase of the first symbol.

The decision circuit 140 may receive the estimation of the symbol from the first filter 130. In some embodiments, the decision circuit 140 may be configured to compare the estimation of the symbol from the first filter 130 to a threshold. Additional discussion regarding the threshold is provided with respect to FIGS. 3 and 4.

In some embodiments, based on the comparison of the estimation of the symbol from the first filter 130 to the threshold, the decision circuit 140 may select between an estimation generated by the first filter 130 and an estimation generated by the second filter 132 to provide to the decoder 160. For example, in response to the estimation of the symbol from the first filter 130 satisfying the threshold, the decision circuit 140 may select the estimation of the symbol from the first filter 130 to provide to the decoder 160. In response to the estimation of the symbol from the first filter 130 not satisfying the threshold, the decision circuit 140 may select an estimation of the symbol from the second filter 132 to provide to the decoder 160. In some embodiments, the decision circuit 140 may provide the selection between the estimations of the first filter 130 and the second filter 132 to the selection circuit 150.

In some embodiments, based on the comparison of the estimation of the symbol from the first filter 130 to the threshold, the decision circuit 140 may enable and/or disable the first filter 130 and/or the second filter 132. For example, the decision circuit 140 may enable the first filter 130 and disable the second filter 132 for the symbol intervals when a symbol is provided to the first filter 130 for estimation of the symbol by the first filter 130. In these and other embodiments, disabling one of the first filter 130 and the second filter 132 may include causing the disabled one of the first filter 130 and the second filter 132 to not perform calculations but the disabled one of the first filter 130 and the second filter 132 may pass values between delay elements that are part of the disabled one of the first filter 130 and the second filter 132 as further explained with respect to FIG. 2*b*.

In some embodiments, in response to the estimation of the symbol from the first filter 130 not satisfying the threshold, the decision circuit 140 may disable the first filter 130 and enable the second filter 132 for the next symbol interval. In these and other embodiments, the next symbol interval may be a second symbol interval for the symbol being buffered by the buffer 120. In response to disabling the first filter 130 and enabling the second filter 132 for a symbol interval, the decision circuit 140 may be configured to enable the first filter 130 and disable the second filter 132 for a subsequent symbol interval. The subsequent symbol interval may be a first symbol interval for a subsequent symbol of the received signal.

In some embodiments, in response to the estimation of the symbol from the first filter 130 satisfying the threshold, the decision circuit 140 may disable the first filter 130 and disable the second filter 132 for the next symbol interval. Alternately or additionally, in response to the estimation of the symbol from the first filter 130 satisfying the threshold, the decision circuit 140 may maintain the first filter 130 enabled and the second filter 132 disabled.

In some embodiments, the selection circuit 150 may be configured to receive the estimation generated by the first filter 130 and the estimation generated by the second filter 132. The selection circuit 150 may be configured to provide one of the estimations output by the first filter 130 and the second filter 132 to the decoder 160. The selection circuit 150 may provide the estimation of one of the first filter 130 or the second filter 132 to the decoder 160 based on the selection made by the decision circuit 140. In some embodiments, the selection circuit 150 may provide one of the estimations output by the first filter 130 and the second filter 132 to the decoder 160 every two symbol intervals.

The decoder 160 may be configured to decode the symbols of the signal. In some embodiments, the decoder 160 may decode the symbols of the signal based on the estimation of one of the first filter 130 or the second filter 132. The decoder 160 may be configured to receive the estimation of one of the first filter 130 or the second filter 132 obtained from the selection circuit 150. As an example, the decoder 160 may include or be a slicer.

The decoder 160 may be configured based on the modulation scheme of the signal. As an example, when the signal is modulated using an NRZ modulation, in response to the estimation of one of the first filter 130 or the second filter 132 being positive, the decoder 160 may output a first discrete value and in response to the estimation of one of the first filter 130 or the second filter 132 being negative, the decoder 160 may output a second discrete value. For example, the first discrete value may be a digital one and the second discrete value may be digital zero. The values of the discrete values may vary based on the system that includes the receiver 100.

An example of the operation of the receiver 100, according to some embodiments, is now provided. A signal is obtained by the ADC 110. The ADC 110 converts the analog values of the signal to discrete values. The discrete values are provided to the buffer 120. The buffer 120 samples the discrete values based on a sampling timing and stores the sampled discrete value as a first value of a first symbol of the signal. The buffer 120 stores the first value for two symbol intervals, referred to as a first symbol interval and a second symbol interval with the second symbol interval immediately following the first symbol interval. The buffer 120 provides the first value of the first symbol to the first filter 130 and to the second filter 132 during the two symbol intervals. Alternately or additionally, the buffer 120 provides the first value of the first symbol to the first filter 130 during the first symbol interval and provides the first value of the first symbol to the second filter 132 during the second symbol interval.

During the first symbol interval, the decision circuit 140 enables the first filter 130 and disables the second filter 132. As a result, during the first symbol interval, the first filter 130 may generate a first filtered estimation of the first symbol. Additionally, during the first symbol interval, the second filter 132 does not generate a second filtered estimation of the first symbol. The first filtered estimation of the first symbol from the first filter 130 may be provided to the decision circuit 140 and the selection circuit 150.

The decision circuit 140 may compare the first filtered estimation to a threshold. In response to the first filtered estimation of the symbol not satisfying the threshold, the decision circuit 140 may disable the first filter 130 and enable the second filter 132 for the second symbol interval. Alternately or additionally, the decision circuit 140 may select a second filtered estimation that is to be generated by the second filter 132 to be provided to the decoder 160 and provide such indication to the selection circuit 150.

In response to the first filtered estimation of the symbol not satisfying the threshold, during the second symbol interview, the second filter 132 may generate the second filtered estimation of the first symbol. The second filter 132 may provide the second filtered estimation to the selection circuit 150. The selection circuit 150 may provide the second filtered estimation to the decoder 160. The decoder 160 may use the second filtered estimation to decode the first symbol and output the first decoded symbol. The operation of the selection circuit 150 and the decoder 160 may occur in overlapping or subsequent symbol intervals than the first and second symbol intervals.

The buffer 120 may also sample additional discrete values based on the sampling timing and stores the sampled discrete value as a second value of a second symbol of the signal. The buffer 120 stores the second value for another two symbol intervals, referred to as a third symbol interval and a fourth symbol interval with the fourth symbol interval immediately following the third symbol interval. The buffer 120 provides the second value of the second symbol to the first filter 130 and to the second filter 132 during the two symbol intervals. Alternately or additionally, the buffer 120 may provide the second value of the second symbol to the first filter 130 during the third symbol interval and provides the second value of the second symbol to the second filter 132 during the fourth symbol interval.

During the third symbol interval, the decision circuit 140 enables the first filter 130 and disables the second filter 132. As a result, during the third symbol interval, the first filter 130 may generate a third filtered estimation of the second symbol and the second filter 132 does not generate a fourth filtered estimation of the second symbol. The third filtered estimation of the second symbol from the first filter 130 may be provided to the decision circuit 140.

The decision circuit 140 may compare the third filtered estimation to the threshold. In response to the third filtered estimation satisfying the threshold, the decision circuit 140 may select the third filtered estimation to be provided to the decoder 160 and provide such indication to the selection circuit 150. Alternately or additionally, in response to the third filtered estimation of the symbol satisfying the threshold, the decision circuit 140 may disable the first filter 130 and maintain the second filter 132 disabled such that during the fourth symbol interval neither the first filter 130 nor the second filter 132 perform calculation operations.

The selection circuit 150 may provide the third filtered estimation to the decoder 160. The decoder 160 may use the third filtered estimation to decode the second symbol and output the decoded second symbol.

Modifications, additions, or omissions may be made to the receiver 100 without departing from the scope of the present disclosure. For example, the receiver 100 may not include the ADC 110. Alternately or additionally, the receiver 100 may be part of a transceiver, such that the transceiver includes the elements of the receiver 100 and additional elements.

As another example, in some embodiments, the decision circuit 140 and the selection circuit 150 may be combined in a single circuit or component. In these and other embodiments, the combined circuit may perform the operations of the decision circuit 140 and the selection circuit 150 as described in this disclosure.

As another example, in some embodiments, the receiver 100 may not include two distinct filters such as the first filter 130 and the second filter 132 as illustrated. For example, the first filter 130 and the second filter 132 may be a single filter as illustrated and described with respect to FIGS. 2a and 2b. In these and other embodiments, in place of enabling and/or disabling the first filter 130 and the second filter 132, the decision circuit 140 may perform operations as described with respect to FIGS. 2a and 2b.

As another example, in some embodiments, the decision circuit 140 may compare the filtered estimation from the first filter 130 to multiple thresholds. In response to the filtered estimation satisfying any one of the multiple thresholds, the decision circuit 140 may indicate that the estimation from the first filter 130 may be provided to the decoder 160. In response to the filtered estimation not satisfying any of the multiple thresholds, the decision circuit 140 may indicate that the estimation from the second filter 132 may be provided to the decoder 160. In these and other embodiments, the number of multiple thresholds may be based on the modulation scheme applied to the signal. Further discussion regarding how to determine the thresholds is provided with respect to FIGS. 3 and 4.

As another example, in some embodiments, the receiver 100 may be formed by individual circuit elements or components. For example, each of the elements illustrated in FIG. 1 may be formed by individual elements or components. Alternately or additionally, one or more of the elements illustrated in FIG. 1 may be formed by an individual component and other of the elements may be implemented in a digital signal processor (DSP), application-specific integrated circuit (ASIC), a Field-Programmable Gate Array (FPGA), a central processing unit (CPU), a graphics processing unit (GPU), or any other digital circuitry configured to interpret and/or to execute program instructions and/or to process data.

Alternately or additionally, all of the components illustrated in FIG. 1 may be implemented in a digital signal processor (DSP), application-specific integrated circuit (ASIC), a Field-Programmable Gate Array (FPGA), a central processing unit (CPU), a graphics processing unit (GPU), or any other digital circuitry configured to interpret and/or to execute program instructions and/or to process data. In these and other embodiments, instructions that may be implemented by a processor may be used to program and/or design the components and/or systems that may cause a system to perform the operations described as performed by the receiver 100 of FIG. 1.

FIG. 2a illustrates an example filter 200. The filter 200 may be arranged in accordance with at least one embodiment described in the present disclosure. The filter 200 may include a first tap 230a, a second tap 230b, and a third tap 230c, referred to collectively as the taps 230. The first tap 230a may include a first delay element 210a, a first multiplier element 220a, and a first summing element 222a. The second tap 230b may include a second delay element 210b, a second multiplier element 220b, and a second summing element 222b. The third tap 230c may include a third delay element 210c, a third multiplier element 220c, and a third summing element 222c. The first delay element 210a, the second delay element 210b, and the third delay element 210c may be referred to collectively as the delay elements 210. The first multiplier element 220a, the second multiplier element 220b, and the third multiplier element 220c may be referred to collectively as the multiplier elements 220. The first summing element 222a, the second summing element 222b, and the third summing element 222c may be referred to collectively as the summing elements 222.

In some embodiments, the delay elements 210 may be configured to delay a signal for a particular time interval. For example, the delay may be equal to a symbol interval of the signal. For example, each of the delay elements 210 may delay the signal two symbol intervals such that an output of the third delay element 210c may be delayed by six symbol intervals.

The multiplier elements 220 may be configured to multiply a value of a symbol at an input with a coefficient. The value of the symbol may be a complex number or real number. Each of the coefficients may be the same or different values. In some embodiments, each of the coefficients may have the same or different number of significant digits.

The summing elements 222 may be configured to obtain values at each of two inputs and output the sum of the inputs. For example, the first summing element 222a may sum the output of the first multiplier element 220a with the symbol as input.

Each of the taps 230 may affect an impulse response of the filter 200. Thus, the impulse response of the filter 200 may be based on the taps 230. More specifically, the impulse response of the filter 200 may be based on the coefficients of the multiplier elements 220 of the taps 230 such that a change to the coefficients of the taps 230 may result in a change to the impulse response of the filter 200. Alternately or additionally, a change to the significant digits of the coefficients of the taps 230 may result in a change to the impulse response of the filter 200.

The filter 200 may be an example of the first filter 130 and/or the second filter 132 of FIG. 1. Referring to both FIGS. 1 and 2a, in some embodiments, the first filter 130 may include N number of taps, such as the taps 230 of the filter 200. The second filter 132 may include M number of taps, such as the taps 230 of the filter 200. In these and other embodiments, N may be smaller than M. As another example, in some embodiments, the first filter 130 may include a same number of taps as the second filter 132. In these and other embodiments, the coefficients of the first filter 130 may have fewer significant digits than the coefficients of the second filter 132. Alternately or additionally, a number of significant digits of the output of delay elements or multipliers may be different. As a result, the processing performed by the multiplier elements 220 of the first filter 130 may be reduced as compared to the processing performed by the multiplier elements 220 of the second filter 132.

As another example, the filter 200 may be an example of both the first filter 130 and the second filter 132. As described above with respect to FIG. 1, the first filter 130 may be configured to generate a filtered estimation during a first symbol interval and the second filter 132 may be configured to generate a filtered estimation during a second symbol interval. Thus, the first filter 130 and the second filter 132 may not operate in substantially overlapping time intervals. In these and other embodiments, the coefficients of the multiplier elements 220 may be adjusted based on whether the filter 200 is operating as the first filter 130 or the second filter 132. For example, for the first filter 130 the coefficients of the multiplier elements 220 may be first values with a first number of significant digits. For the second filter 132, the coefficients of the multiplier elements 220 may be second values with a second number of significant digits that is greater than the first number of significant digits. The coefficients of the multiplier elements 220 of each of the taps 230 may be changed based on which of the first filter 130 and the second filter 132 is configured to generate a filtered estimation. Thus, enabling one of the first filter 130 and the second filter 132 may include loading the coefficients associated with the one of the first filter 130 and the second filter 132. In these and other embodiments, disabling one of the first filter 130 and the second filter 132 may include the coefficients associated with the one of the first filter 130 and the second filter 132 not be loaded in the filter 200.

Modifications, additions, or omissions may be made to the filter 200 without departing from the scope of the present disclosure. For example, the filter 200 may include more or fewer taps 230 than those illustrated. Alternately or additionally, the filter 200 may include other components than those illustrated. For example, the filter 200 may include components that may be included in an infinite impulse response filter.

FIG. 2b illustrates an example filter 250. The filter 250 may be arranged in accordance with at least one embodiment described in the present disclosure. The filter 250 may include a first tap 280a, a second tap 280b, a third tap 280c, a fourth tap 280d, and a fifth tap 280e referred to collectively as the taps 280.

The first tap 280a may include a first delay element 260a, a first multiplier element 270a, and a first summing element 272a. The second tap 280b may include a second delay element 260b, a second multiplier element 270b, and a second summing element 272b. The third tap 280c may include a third delay element 260c, a third multiplier element 270c, and a third summing element 272c. The fourth tap 280d may include a fourth delay element 260d, a fourth multiplier element 270d, and a fourth summing element 272d. The fifth tap 280e may include a fifth delay element 260e, a fifth multiplier element 270e, and a fifth summing element 272e. The taps 280 may be analogous to the taps 230 of FIG. 2a, respectively, and no further description is provided with respect to FIG. 2b.

The delay elements 260, the multiplier elements 270, and the summing elements 272 may be analogous to the delay elements 210, the multiplier elements 220, and the summing elements 222 of FIG. 2a, respectively, and no further description is provided with respect to FIG. 2b.

The filter 250 may be an example of the first filter 130 and the second filter 132 of FIG. 1 combined in a single filter. Referring to both FIGS. 1 and 2b, in some embodiments, the filter 250 may include a first output after the second tap 280b. The first output may be used as the output of the first filter 130. A second output of the filter 250 after the fifth tap 280e may be used as the output of the second filter 132. In these and other embodiments, when the second filter 132 is not enabled, the multiplier elements 270c-270e and the summing elements 272c-272e may not operate, however, the delay elements 260c-260e may continue to function. Alternately or additionally, the delay elements 260c-260e may be disabled. Alternately or additionally, when the second filter 132 is enabled after the first output is determined, the calculations performed by the first tap 280a and the second tap 280b may not be duplicated. For example, the first output may be used as the input for the third tap 280c and the calculations performed by the first tap 280a and the second tap 280b may not again be performed to generate the second output.

Modifications, additions, or omissions may be made to the filter 250 without departing from the scope of the present disclosure. For example, the filter 250 may include more or fewer taps 280 than those illustrated and/or the location of the first output may vary. Alternately or additionally, the filter 250 may include other components than those illustrated. For example, the filter 250 may include components that may be included in an infinite impulse response filter.

Figure 3:
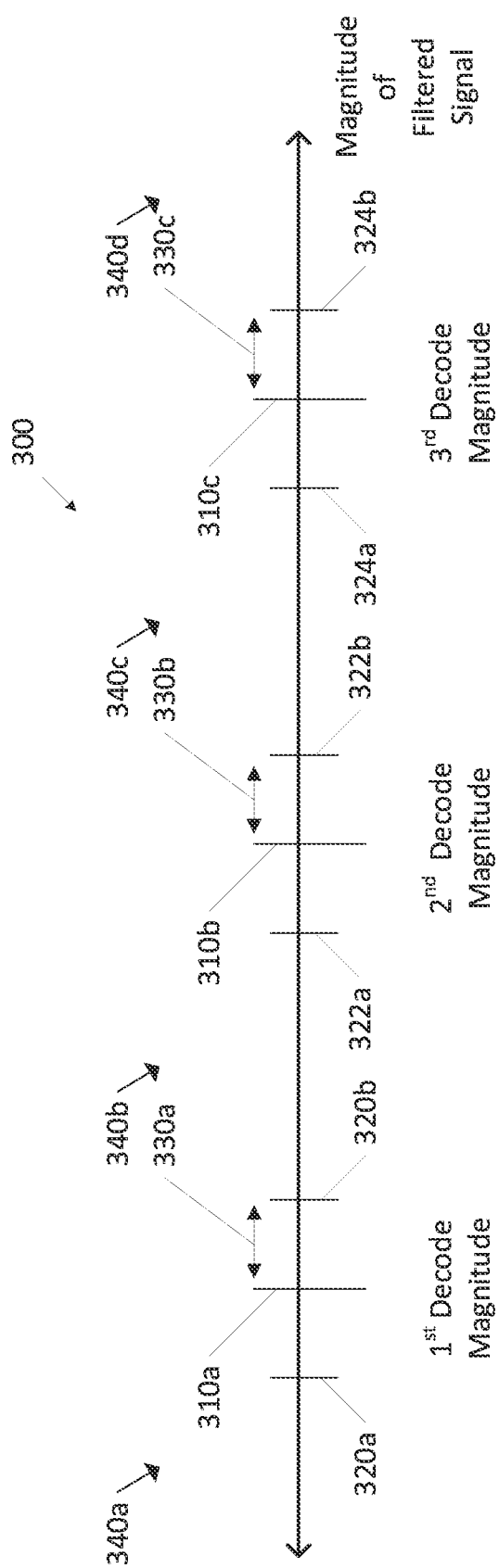
FIG. 3 illustrates a diagram illustrating thresholds of a filtered signal.

FIG. 3 illustrates an example diagram 300 illustrating thresholds of a filtered signal. The diagram 300 may be arranged in accordance with at least one embodiment described in the present disclosure. The filtered signal as illustrated may include a modulation scheme that includes four constellation points. Based on the four constellation points, decoding of a symbol of the filtered signal is performed using three decode magnitudes 310 or edges. The three decode magnitudes 310 include a first decode magnitude 310*a*, a second decode magnitude 310*b*, and a third decode magnitude 310*c*, referred to collectively as the decode magnitudes 310.

Generally, a modulation scheme may include any number of constellation points. For example, a modulation scheme may be defined as a set $\{s_1, s_2, \ldots, s_M\}$, where M is the size of the constellation and $s_i$ is the symbol to be sent. As an example, for a 4-PAM modulation scheme the set of symbols may be $\{-3, -1, 1, 3\}$. As another example, for an 8-PAM modulation scheme the set of symbols may be $\{-7, -5, -3, -1, 1, 3, 5, 7\}$. The values in the set of symbols may represent the symbols of the set of symbols. A number of decode magnitudes or edges used by a decoder may be one less than the number of constellations in a modulation scheme. For example, the 4-PAM modulation scheme may include three decode magnitudes. The decode magnitudes may be set at intervals between symbol values of the symbols. For example, for the 4-PAM modulation scheme, the decode magnitudes may be $\{-2, 0, 2\}$. As an example, if a filtered estimation is less than −2, a decoder may decode the symbol as being −3. As another example, if a filtered estimation is between 0 and 2, a decoder may decode the symbol as being 1. Thus, the decode magnitudes may represent decision points for the decoder to select between different potential symbols to assign to the received symbol.

In some embodiments, a receiver as described in this disclosure may use a threshold or multiple thresholds. For example, a decision circuit such as the decision circuit 140 of FIG. 1 may use one or more thresholds. A number of thresholds used by a decision circuit may be related to the number of constellations of a modulation scheme of a received signal. Thus, the number of thresholds may be based on the modulation scheme.

The diagram 300 illustrates a first threshold 340*a*, a second threshold 340*b*, a third threshold 340*c*, and a fourth threshold 340*d*, referred to collectively as the thresholds 340. The thresholds 340 are determined based on the decode magnitudes 310. For example, the thresholds 340 are determined based on the decode magnitudes 310 and a corresponding magnitude offset 330 determined for each of the decode magnitudes 310.

The diagram 300 illustrates a first magnitude offset 330*a*, a second magnitude offset 330*b*, and a third magnitude offset 330*c*, referred to collectively as the magnitude offsets 330. The first magnitude offset 330*a* may correspond to the first decode magnitude 310*a*. The second magnitude offset 330*b* may correspond to the second decode magnitude 310*b*. The third magnitude offset 330*c* may correspond to the third decode magnitude 310*c*. The magnitude offsets 330 may be determined based on the inter-symbol interference (ISI) that may occur at each of the decode magnitudes 310. Alternately or additionally, the magnitude offsets 330 may be determined based on noise in a channel through which the received signal is sent. Thus, each of the magnitude offsets 330 may have a different value. A discussion regarding how the magnitude offsets 330 are determined is provided with respect to FIG. 4.

In some embodiments, the magnitude offsets 330 may be applied positively and negatively to the decode magnitudes 310 to determine two magnitude values associated with each decode magnitude 310. The diagram 300 illustrates a first magnitude 320*a* and a second magnitude 320*b* associated with the first decode magnitude 310*a*. The first magnitude 320*a* may be equal to the first decode magnitude 310*a* minus the first magnitude offset 330*a*. The second magnitude 320*b* may be equal to the first decode magnitude 310*a* added to the first magnitude offset 330*a*. In an analogous manner, a third magnitude 322*a* and a fourth magnitude 322*b* may be associated with the second decode magnitude 310*b* based on the second magnitude offset 330*b* and a fifth magnitude 324*a* and a sixth magnitude 324*b* may be associated with the third decode magnitude 310*c* based on the third magnitude offset 330*c*. In some embodiments, the magnitude offset applied to one of the decode magnitudes 310 may vary. For example, a magnitude offset subtracted from a decode magnitude 310 may be different from a magnitude offset added to the decode magnitude 310. Thus, in these and other embodiments, six different magnitude offsets may be used for the decode magnitudes 310.

The first threshold 340*a* may be based on the first magnitude 320*a* and may include values less than the first magnitude 320*a*. The second threshold 340*b* may be based on the second magnitude 320*b* and the third magnitude 322*a* and may include values between the second magnitude 320*b* and the third magnitude 322*a*. The third threshold 340*c* may be based on the fourth magnitude 322*b* and the fifth magnitude 324*a* and may include values between the fourth magnitude 322*b* and the fifth magnitude 324*a*. The fourth threshold 340*d* may be based on the sixth magnitude 324*b* and may include values greater than the sixth magnitude 324*b*.

In some embodiments, a filtered estimation may be considered to satisfy one of the thresholds 340 when the magnitude falls within the threshold. Thus, when an estimation output by a first filter, such as the first filter 130 of FIG. 1 is within one of the ranges of the thresholds 340, the estimation may be considered to satisfy a threshold. As such, an estimation output by the first filter may be used by a decoder. When an estimation output by a first filter, such as the first filter 130 of FIG. 1 does not satisfy any of the thresholds 340, such that the estimation falls within the range of the magnitude offsets 330 of the decode magnitudes 310, an estimation output by a second filter, such as the second filter 132 of FIG. 1, may be used by the decoder.

In general, the estimations within the range of the magnitude offsets 330 of the decode magnitudes 310 may represent estimations that are close to decision points used by a decoder to select between different symbols. To help to increase an ability of the decoder to accurately decode a symbol, estimations within the range of the magnitude offsets 330 of the decode magnitudes 310 may be subject to additional equalization to help achieve an estimation that is more likely a correct estimation of the symbol. Thus, symbols with filtered estimations after a first equalization that do not satisfy any of the thresholds 340, for example symbols with estimation values that are within the range of the magnitude offsets 330 of the decode magnitudes 310, may have additional equalization applied by another filter, such as the second filter 132 of FIG. 1, before being provided to a decoder.

Figure 4:
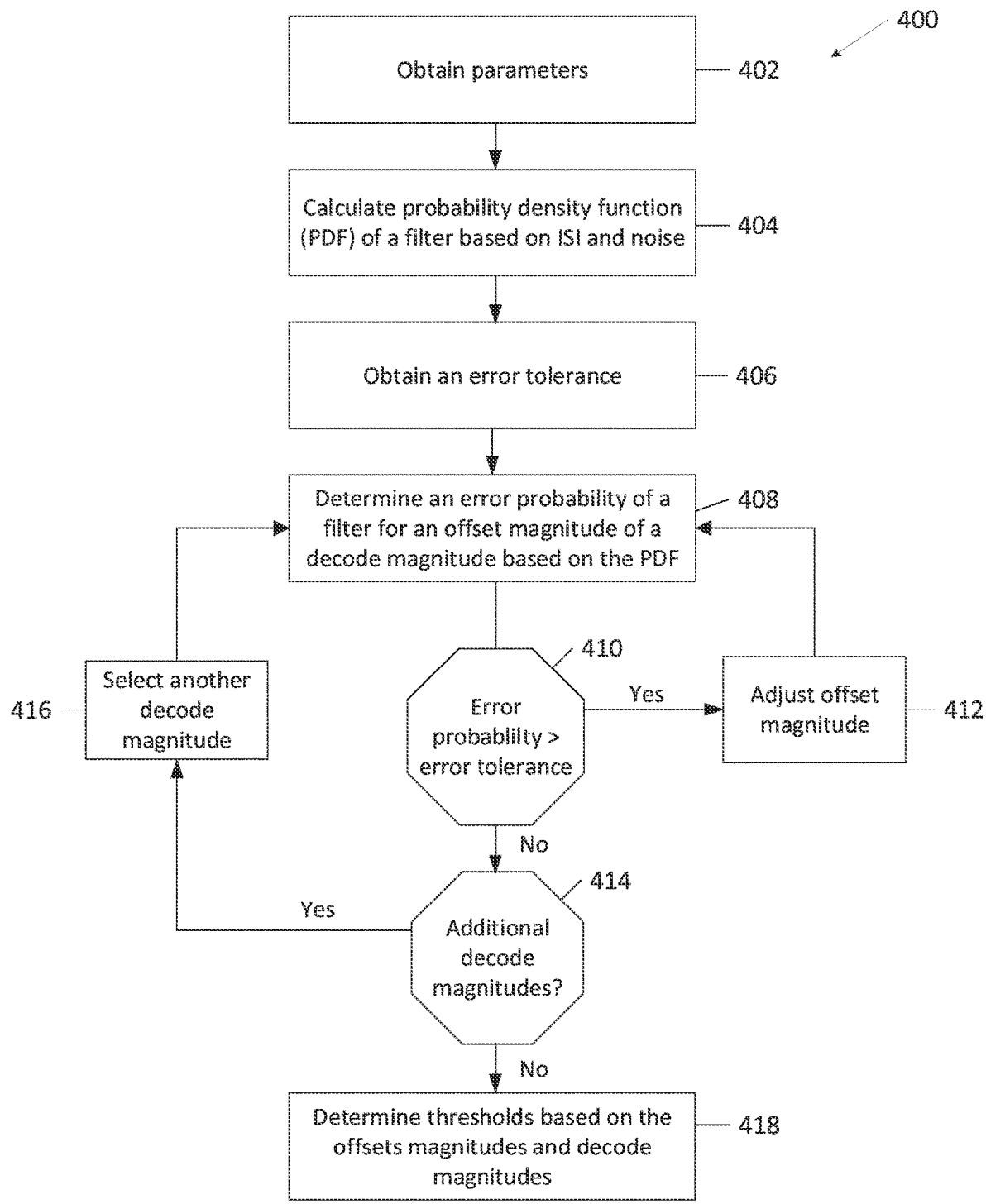
FIG. 4 illustrates a flowchart of an example method to determine a threshold.

FIG. 4 illustrates a flowchart of example method 400 to determine a threshold. The method 400 may be arranged in accordance with at least one embodiment described in the present disclosure. The method 400 may be performed, in some embodiments, by a circuit, such as the receiver 100 or another device or system. Although illustrated as discrete blocks, various blocks may be divided into additional blocks, combined into fewer blocks, or eliminated, depending on the desired implementation.

The method 400 may begin at block 402, where parameters may be obtained. The parameter may include a constellation set of a modulation scheme being used for a signal received by a receiver. For example, the signal may be the signal received by the receiver 100 of FIG. 1. The constellation set of a modulation scheme may be represented by $\Sigma=\{s_1, s_2, \ldots, s_M\}$, where M is the size of the constellation and $s_i$ is the symbol to be sent.

The parameters may also include coefficients of taps of a filter. For example, the coefficients of taps of the filter may be the coefficients of taps of the first filter 130 of FIG. 1. The tap coefficients may be represented by $\Omega=\{w_{-K}, w_{-K+1}, \ldots, w_{-1}, w_0, w_1, \ldots, w_{K-1}, w_K\}$ where 2K+1 is the number of the taps.

The parameters may also include an estimated impulse response of the channel through which the signal is sent that is received by the receiver. The estimated impulse response of the channel may be represented by $H=\{h_{-N}, h_{-N+1}, \ldots, h_{-1}, h_0, h_1, \ldots, h_{N-1}, h_N\}$, where $h_i$ is the channel response at time i when an impulse is applied at the channel input. The channel noise may be determined and represented by C. The channel noise C may be modeled as a Gaussian random variable.

At block 404, a probability density function (PDF) of the filter output may be calculated based on the filter tap coefficients, the inter-symbol interference (ISI) of the signal and the channel noise C. The ISI of the signal may be determined based on the impulse response of the channel given a series of symbols sent through the channel. The series of symbols may be represented by $\{x_i\}$ ($x_i \in \Sigma$). A symbol $y_i$ received after passing through the channel may be represented as $y_i = \sum_{i-N \leq j \leq i+N} h_{i-j} x_j + C$. A symbol equalized by the filter after passing through the channel may be represented by $z_i = \sum_{-K \leq j \leq K} w_j y_{i-j}$.

The probability density function (PDF) of the filter output may be represented by the following function: $f(y_i|x_i=s_j)$ for $j=1, 2, \ldots, M$ with the randomness coming from interference symbols $x_k$, where k does not equal i, and the noise of the channel C.

At block 406, an error tolerance may be obtained. The error tolerance may be determined based on a design of the receiver and/or system in which the receiver may be operating.

At block 408, an error probability of the filter may be determined for an offset magnitude of a decode magnitude based on the PDF. To begin, a decode magnitude may be selected for the modulation scheme. After selection of the decode magnitude, an initial offset magnitude for the selected decode magnitude may be selected. The initial offset magnitude may be zero or some other value based on previous experience. The error probability of the filter with respect to the selected decode magnitude ($E_k$) may be represented by $P_e[k]$ and calculated as follows:

$$P_e[k] \leq 1/M \sum_{1 \leq i \leq k} \int_{Ek+thk}^{+\infty} f(y|x=s_i)dy + 1/M \sum_{1+k \leq i \leq M} \int_{-\infty}^{Ek-thk} f(y|x=s_i)dy$$

where $th_k$ is the offset magnitude and $E_k$ is the selected decode magnitude, and k is the value that represents the index of the selected decode magnitude.

At block 410, it may be determined if the error probability is greater than the error tolerance. In response to the error probability being greater than the error tolerance, the method 400 may proceed to block 412. In response to error probability being less than the error tolerance, the method 400 may proceed to block 414. The error probability being less than the error tolerance may indicate that the magnitude offset ($th_k$) used to determine the error probability may be used for the decode magnitude ($E_k$).

At block 412, the magnitude offset may be adjusted. The magnitude offset may be adjusted based on a searching step. The searching step size may be selected based on a processing time desired and/or processing resources, among other factors. After block 412, the method 400 may return to block 408 where the error probability of the filter may be determined for the selected decode magnitude and the updated magnitude offset. For example, the variable $th_k$ in the equation described with respect to block 408 may be adjusted based on the searching step.

At block 414, it may be determined if there are additional decode magnitudes. In response to there being additional decode magnitudes, the method 400 may proceed to block 416. In response to no additional decode magnitudes, the method 400 may proceed to block 418.

At block 416, another decode magnitude may be selected. The other decode magnitude selected may be a decode magnitude for which a magnitude offset has not been determined. After block 416, the method 400 may return to block 408 where the error probability of the filter may be determined for the selected other decode magnitude with an initial magnitude offset. For example, the variable k in the equation described with respect to block 408 may be incremented.

At block 418, thresholds may be determined based on the magnitude offsets and the decode magnitudes. In some embodiments, the thresholds may be determined as illustrated in the diagram 300 of FIG. 3.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 400 may further include additional considerations. For example, in some embodiments, the thresholds may be adjusted based on the filtered output and/or the decoded result of the previous symbols. For example, the magnitude offsets that surround a decode magnitude that is used to select the previous symbol may be reduced for the current symbol based on the PDF refined with the decoded former symbols. For example, for a 4-PAM modulation scheme the set of symbols may be $\{-3, -1, 1, 3\}$ and the decode magnitudes may be $\{-2, 0, 2\}$. A magnitude offset of 0.2 for the −2 decode magnitude may be determined as discussed with respect to method 400. If the previous symbol is decoded as −3, the magnitude offset of 0.2 for the −2 decode magnitude, which was used to decode the previous symbol, may be adjusted. For example, the magnitude offset of 0.2 may be reduced to 0.15 for the current symbol. If the current symbol is decoded as a −3, the magnitude offset for the −2 decode magnitude may be adjusted to another value, e.g. 0.2. Adjusting the magnitude offsets may result in an adjustment of the thresholds that are set based on the magnitude offset. An amount of the reduction of the magnitude offset may vary based on an error tolerance of the system that includes the receiver and/or other factors.

Figure 5:
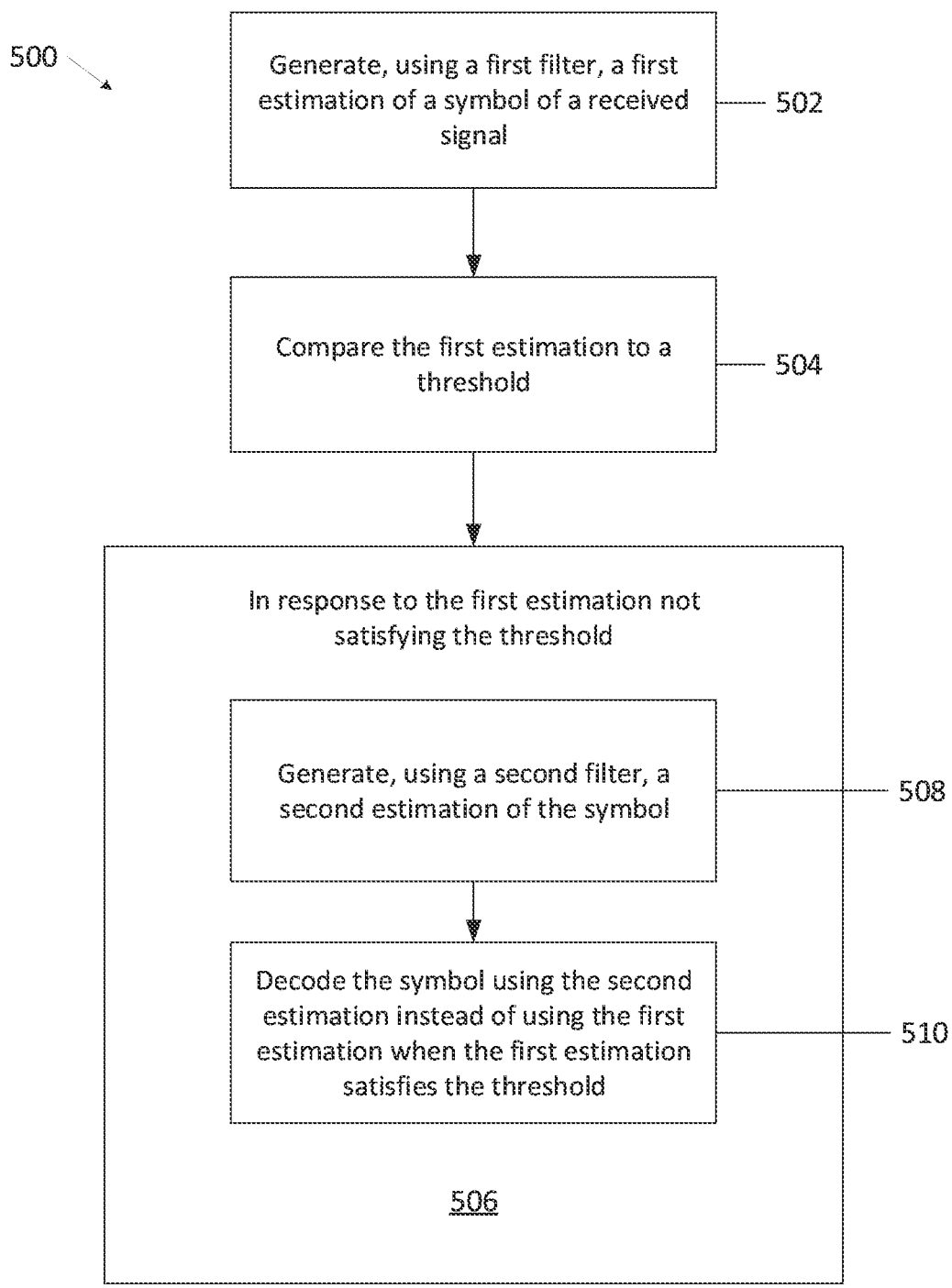
FIG. 5 illustrates a flowchart of an example method to filter a signal.

FIG. 5 illustrates a flowchart of example method 500 to filter a signal. The method 500 may be arranged in accordance with at least one embodiment described in the present disclosure. The method 500 may be performed, in some embodiments, by a circuit, such as the receiver 100 or another device or system. Although illustrated as discrete blocks, various blocks may be divided into additional blocks, combined into fewer blocks, or eliminated, depending on the desired implementation.

The method 500 may begin at block 502, where a first estimation of a symbol of a received signal may be generated using a first filter. At block 504, the first estimation may be compared to an threshold. In some embodiments, the threshold may be determined based on modulation scheme used to generate the symbol. Alternately or additionally, the may be determined based on an amount of inter-symbol interference amongst symbols of the received signal and/or the coefficients of the taps of the filter.

In response to the first estimation not satisfying the threshold, the method 500 may proceed to blocks 508 and 510. At block 508, a second estimation of the symbol may be generated using a second filter. At block 510, the symbol may be decoded using the second estimation instead of using the first estimation when the first estimation satisfies the threshold.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 500 may further include generating, using the first filter, a third estimation of a second symbol of the received signal and comparing the third estimation to the threshold. In response to the first estimation satisfying the threshold, the method 500 may further include providing the third estimation to the decoder to decode the second symbol. In these and other embodiments, the second filter may not generate a fourth estimation of the second symbol when the third estimation satisfies the threshold.

FIG. 6 illustrates an example device 600 that may include a receiver 610, a processor 612, and memory 614. The device 600 may be part of server, desktop, laptop, mobile device, smart phone, wearable device, networking devices, storage devices, among other devices that send and receive or write and read data signals, In some embodiments, the receiver 610 may be an example of the receiver 100 of FIG. 1. The receiver 610 may be configured to receive a modulated signal and decode the modulated signal. The decoded signal may be provided to the processor 612 and/or memory 614 of the device 600.

Generally, the processor 612 may include any suitable computer, computing entity, or processing device including various computer hardware or software modules and may be configured to execute instructions stored on any applicable computer-readable storage media. For example, the processor 612 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 6, it is understood that the processor 612 may include any number of processors distributed across any number of networks or physical locations that are configured to perform individually or collectively any number of operations described herein. In some embodiments, the processor 612 may interpret and/or execute program instructions and/or process data stored in the memory 614. In some embodiments, the 612 may execute the program instructions stored in the memory 614.

For example, in some embodiments, the processor 612 may execute program instructions stored in the memory 614 that are related to operations performed by the receiver 610. As another example, the memory 614 may include instructions that when executed by the processor 612 may result in the instantiation of the receiver 610 in a FGPA or other device.

The memory 614 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 612.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media.

Computer-executable instructions may include, for example, instructions and data configured to cause the processor 612 to perform a certain operation or group of operations as described in this disclosure. In these and other embodiments, the term "non-transitory" as explained in the present disclosure should be construed to exclude only those types of transitory media that were found to fall outside the scope of patentable subject matter in the Federal Circuit decision of *In re Nuijten,* 500 F.3d 1346 (Fed. Cir. 2007). Combinations of the above may also be included within the scope of computer-readable media.

Modifications, additions, or omissions may be made to the device 600 without departing from the scope of the present disclosure. For example, in some embodiments, the device 600 may include any number of other components that may not be explicitly illustrated or described. Further, depending on certain implementations, the device 600 may not include one or more of the components illustrated and described.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

The invention claimed is:

1. A receiver, comprising:
a first filter operable to generate a first estimation of a symbol in a received signal;
a second filter operable to generate a second estimation of the symbol in the received signal; and
a decision circuit to enable the first filter and disable the second filter causing the first filter to generate the first estimation and the first estimation to be directed to a decoder to decode the symbol based on a comparison of the first estimation to a threshold,
wherein in response to the first estimation failing to satisfy the threshold, the decision circuit is configured to disable the first filter and enable the second filter causing the second estimation to be directed to the decoder to decode the symbol based on a comparison of the second estimation to the threshold.

2. The receiver of claim 1, wherein the second filter does not generate the second estimation when disabled by the decision circuit, and the first filter does not generate the first estimation when disabled by the decision circuit in response to the first estimation failing to satisfy the threshold.

3. The receiver of claim 1, wherein the threshold is based on an offset magnitude applied to a decode magnitude used to decode the symbol, wherein the offset magnitude is determined based on a probability density function of the first estimation of the first filter.

4. The receiver of claim 1, wherein the first filter includes a first number of taps, the second filter includes a second number of taps, and the first number of taps is smaller than the second number of taps.

5. The receiver of claim 1, wherein the decision circuit is configured to direct one of the first estimation and the second estimation to the decoder for decoding of the symbol based on the comparison of the first estimation to a plurality of thresholds that include the threshold.

6. The receiver of claim 1, wherein the threshold is determined based on an amount of inter-symbol interference amongst symbols of the received signal.

7. The receiver of claim 1, wherein the threshold is determined based on a modulation scheme that was used to generate the symbol.

8. The receiver of claim 1, wherein the threshold is determined based on a magnitude of a previous symbol, the previous symbol occurring before the symbol in the received signal.

9. The receiver of claim 1, wherein the second filter is enabled and only generates the second estimation of the symbol after the first filter generates the first estimation of the symbol that does not satisfy the threshold and the first filter is disabled.

10. The receiver of claim 1, wherein the second filter includes the first filter.

11. A method, comprising:
    enabling, by a decision circuit, a first filter;
    generating, using the first filter, a first estimation of a symbol of a received signal;
    comparing the first estimation to a threshold; and
    in response to the first estimation not satisfying the threshold:
        disabling, by the decision circuit, the first filter;
        enabling, by the decision circuit, a second filter;
        generating, using the second filter, a second estimation of the symbol; and
        decoding the symbol using the second estimation instead of using the first estimation.

12. The method of claim 11, further comprising:
    disabling, by the decision circuit, the second filter;
    enabling, by the decision circuit, the first filter;
    generating, using the first filter, a third estimation of a second symbol of the received signal;
    comparing the third estimation to the threshold; and
    in response to the third estimation satisfying the threshold, decoding the symbol using the third estimation.

13. The method of claim 12, wherein the second filter does not generate a fourth estimation of the second symbol when the third estimation satisfies the threshold.

14. The method of claim 11, further comprising determining the threshold based on an amount of inter-symbol interference amongst symbols of the received signal.

15. The method of claim 11, wherein the threshold is determined based on a modulation scheme that was used to generate the symbol.

16. The method of claim 11, wherein the threshold is determined based on a magnitude of a previous symbol, the previous symbol occurring before the symbol in the received signal.

17. A non-transitory computer-readable medium configured to store instructions, the instructions configured to be executed by a processor to configure a system to perform operations, the operations including:
    enable, by a decision circuit, a first filter;
    generate, using the first filter, a first estimation of a symbol of a received signal;
    compare the first estimation to a threshold; and
    in response to the first estimation not satisfying the threshold:
        disable, by the decision circuit, the first filter;
        enable, by the decision circuit, a second filter;
        generate, using the second filter, a second estimation of the symbol; and
        decode the symbol using the second estimation instead of using the first estimation.

18. The non-transitory computer-readable medium of claim 17, wherein the operations further comprise:
    disable, by the decision circuit, the second filter;
    enable, by the decision circuit, the first filter;
    generate, using the first filter, a third estimation of a second symbol of the received signal;
    compare the third estimation to the threshold; and
    in response to the third estimation satisfying the threshold, decode the symbol using the third estimation.

19. The non-transitory computer-readable medium of claim 17, wherein the operations further comprise determine the threshold based on coefficients of taps of the first filter and coefficients of taps of the second filter.

20. The non-transitory computer-readable medium of claim 17, wherein the operations further comprise determine the threshold based on a magnitude of a subsequent symbol, the subsequent symbol occurring after the symbol in the received signal.

* * * * *